(12) United States Patent
Pratt

(10) Patent No.: US 8,888,425 B2
(45) Date of Patent: Nov. 18, 2014

(54) BLIND FASTENER

(75) Inventor: John D. Pratt, Laguna Niguel, CA (US)

(73) Assignee: Monogram Aerospace Fasteners, Inc., Los Angeles, CA (US)

( * ) Notice: Subject to any disclaimer, the term of this patent is extended or adjusted under 35 U.S.C. 154(b) by 317 days.

(21) Appl. No.: 13/245,944

(22) Filed: Sep. 27, 2011

(65) Prior Publication Data

US 2012/0011702 A1 Jan. 19, 2012

Related U.S. Application Data

(63) Continuation of application No. PCT/US2010/028832, filed on Mar. 26, 2010.

(60) Provisional application No. 61/164,141, filed on Mar. 27, 2009.

(51) Int. Cl.
| F16B 13/04 | (2006.01) |
| F16B 5/04 | (2006.01) |
| F16B 19/10 | (2006.01) |

(52) U.S. Cl.
CPC .............. *F16B 19/1045* (2013.01); *F16B 5/04* (2013.01)
USPC .................................. 411/34; 411/38; 411/55

(58) Field of Classification Search
USPC ................ 29/525.02; 411/34, 38, 43, 55, 352
See application file for complete search history.

(56) References Cited

U.S. PATENT DOCUMENTS

| 2,282,711 A | 5/1942 | Eklund |
| 2,508,409 A | 5/1950 | Le Barron Lord |
| 2,763,314 A | 9/1956 | Gill |
| 2,863,351 A | 12/1958 | Vaughn |
| 2,971,425 A | 2/1961 | Blakeley |
| 3,058,386 A | 10/1962 | Morrow |
| 3,236,143 A | 2/1966 | Wing |
| 3,253,495 A | 5/1966 | Orloff |
| 3,283,640 A | 11/1966 | Telzo Ono |
| 3,322,449 A | 5/1967 | Becker |
| 3,345,900 A | 10/1967 | Villo |
| 3,461,771 A | 8/1969 | Brilles |
| 4,015,505 A | 4/1977 | Murray |
| 4,237,768 A | 12/1980 | Volkmann |
| 4,364,697 A | 12/1982 | Binns |
| 4,501,515 A | 2/1985 | Scott |
| 4,772,167 A | 9/1988 | Beals |
| 4,900,205 A | 2/1990 | Sadri |
| 4,919,576 A * | 4/1990 | Louw et al. ..................... 411/34 |
| 4,929,134 A | 5/1990 | Bergner |

(Continued)

OTHER PUBLICATIONS

Korean Intellectual Property Office; International Search Report dated Oct. 22, 2010 in related PCT Application No. PCT/US2010/028832.

(Continued)

*Primary Examiner* — Roberta Delisle

(74) *Attorney, Agent, or Firm* — Woodard, Emhardt, Moriarty, McNett & Henry LLP

(57) ABSTRACT

Disclosed is a blind bolt fastener that includes a threaded nut and bolt combination that passes through a deformable sleeve that has a shoulder, a deformable portion and a non-deformable portion. Upon tightening of the threaded bolt and nut combination, the deformable portion is compressed so that it bulbs to form a bulbed head. The shoulder on the sleeve blocks further compression of the deformable portion once the bulbed head is substantially completely formed.

22 Claims, 6 Drawing Sheets

(56) References Cited

U.S. PATENT DOCUMENTS

| | | | |
|---|---|---|---|
| 4,950,115 A | 8/1990 | Sadri | |
| 4,967,463 A * | 11/1990 | Pratt | 29/525.06 |
| 4,973,210 A | 11/1990 | Osborne et al. | |
| 4,984,945 A | 1/1991 | Bergner | |
| 4,988,247 A | 1/1991 | Summerlin | |
| 5,046,348 A | 9/1991 | Pratt | |
| 5,051,048 A | 9/1991 | Maddox | |
| 5,152,648 A | 10/1992 | Pratt | |
| 5,263,803 A | 11/1993 | Anquetin | |
| 5,498,110 A | 3/1996 | Stencel et al. | |
| 5,569,005 A | 10/1996 | Millington | |
| 5,634,751 A | 6/1997 | Stencel et al. | |
| 5,759,001 A | 6/1998 | Smith | |
| 5,816,761 A | 10/1998 | Cassatt et al. | |
| 5,947,667 A | 9/1999 | Cassatt et al. | |
| 6,021,617 A | 2/2000 | Sheahan | |
| 6,062,783 A | 5/2000 | Austin | |
| 6,224,309 B1 * | 5/2001 | Yamamoto | 411/11 |
| 6,868,757 B2 | 3/2005 | Hufnagl et al. | |
| 7,033,120 B2 * | 4/2006 | Hufnagl et al. | 411/34 |
| 7,857,563 B2 * | 12/2010 | Pratt | 411/34 |
| 2004/0022596 A1 | 2/2004 | Belanger | |
| 2004/0033119 A1 | 2/2004 | Hufnagl et al. | |
| 2005/0123372 A1 | 6/2005 | Sato | |
| 2007/0243035 A1 | 10/2007 | Pratt | |

OTHER PUBLICATIONS

Korean Intellectual Property Office; Written Opinion dated Oct. 22, 2010 received in related PCT Application No. PCT/US2010/028832.

* cited by examiner

US 8,888,425 B2

BLIND FASTENER

CROSS REFERENCE TO RELATED APPLICATIONS

The present application is a continuation of PCT/US2010/028832 filed Mar. 26, 2010, PCT/US2010/028832 claims the benefit of U.S. Provisional Patent Application Ser. No. 61/164,141 filed Mar. 27, 2009.

BACKGROUND

Blind bolt fasteners can be used to connect two or more components together when access to one side of the components is limited. Blind bolt fasteners are also used with robotic assembly equipment to eliminate the need to coordinate activity on both sides of a fastener. By way of example, blind bolt fasteners are used to attach panels to other components to make wings, flaps, ailerons and other airframe structures. Fasteners used on aerodynamically critical surfaces generally have flush heads that seat into machined or dimpled countersinks in the outer panel. Fasteners used in interior assemblies may have generally protruding heads.

Disclosed is a blind bolt fastener that includes a threaded nut and bolt combination that passes through a deformable sleeve that has a shoulder, a deformable portion and a non-deformable portion. Upon tightening of the threaded bolt and nut combination, the deformable portion is compressed so that it bulbs to form a bulbed head. The shoulder on the sleeve blocks further compression of the deformable portion once the bulbed head is substantially completely formed.

DETAILED DESCRIPTION OF THE DRAWINGS

Figure 1:
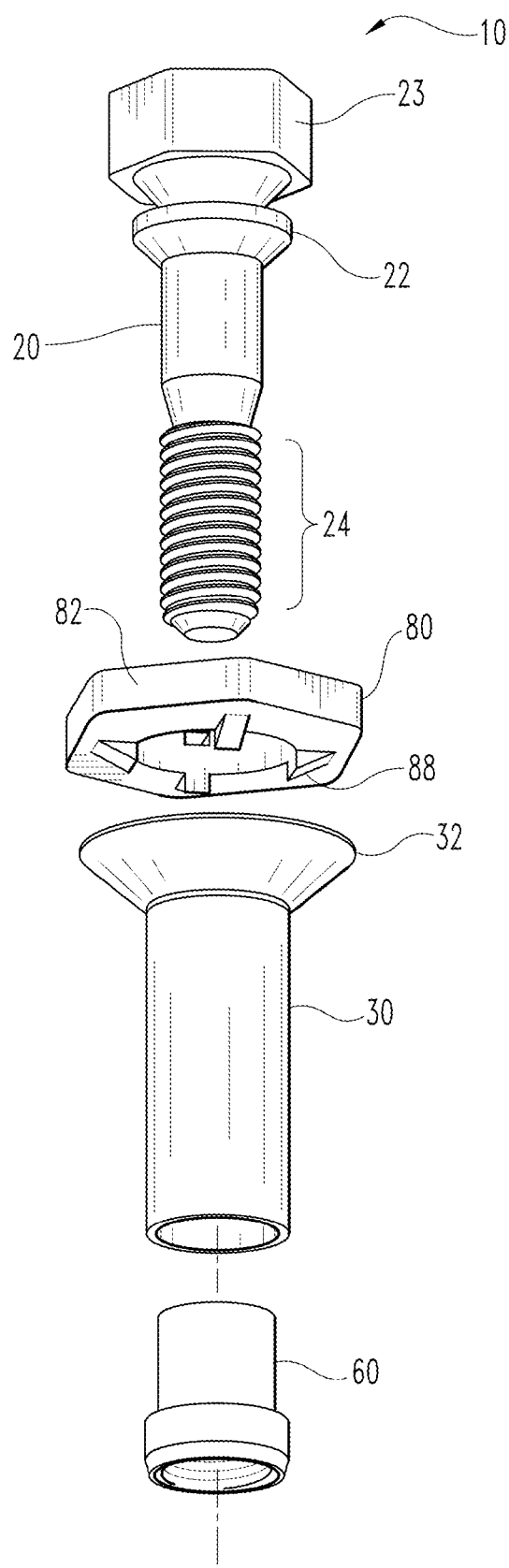
FIG. 1 is an exploded perspective assembly view of a blind bolt fastener.

For the purpose of promoting an understanding of the claims, reference will now be made to certain embodiments thereof and specific language will be used to describe the same. It will nevertheless be understood that no limitation of the scope of this disclosure and the claims is thereby intended, such alterations, further modifications and further applications of the principles described herein being contemplated as would normally occur to one skilled in the art to which the disclosure relates. In several figures, where there are the same or similar elements, those elements are designated with the same or similar reference numerals.

As used herein, "above," "top," "second end" and "front side" refers to the head side of the blind bolt fastener that includes the head portions of the bolt and sleeve. Similarly, "bottom," "below," "first end" and "blind side" refers to the side of the blind bolt fastener that passes through the work pieces and may include the threaded portions of the bolt, the deformable portion of the sleeve and the nut.

"Wrenching portions" and/or "wrenching surfaces" as used herein include any known surface that can be used to engage a manual or automatic tool including a cylindrical surface engagable by a one-way clutch or roller clutch. The blind bolt fasteners disclosed herein can be used in both manual and automatic applications. Use of cylindrical surfaces instead of wrenching flats may make it easier to use blind bolt fasteners with automatic installation robots. Conversely, in manual applications, human operators are adapt at adjusting parts as required to fit geometric wrenches and geometric wrench apparatus are generally less expensive than one-way clutches so other applications lend themselves to the use of conventional wrenching surfaces. Furthermore, the wrenching portions illustrated herein are generally external wrenching portions such as conventional hex-shaped surfaces. In other non-illustrated embodiments, many of these external surfaces could be replaced with internal wrenching recesses such as a hex-shaped Allen® recess. In other embodiments, other types of internal wrenching surfaces known in the art may be used such as POZIDRIV®, TORX®, Spline Drive, Double Hex or Triple Square recesses to name a few non-limiting examples of internally recessed wrenching surfaces.

Referring now to the drawings and in particular FIG. 1, blind bolt fastener 10 is illustrated as including bolt 20, sleeve 30, nut 60 and drive nut 80. Blind bolt fastener 10 is assembled with bolt 20 extending through drive nut 80 and sleeve 30 and threadingly engaged with nut 60. Sleeve 30 and drive nut 80 are positioned between bolt 20 and nut 60.

Figure 2:
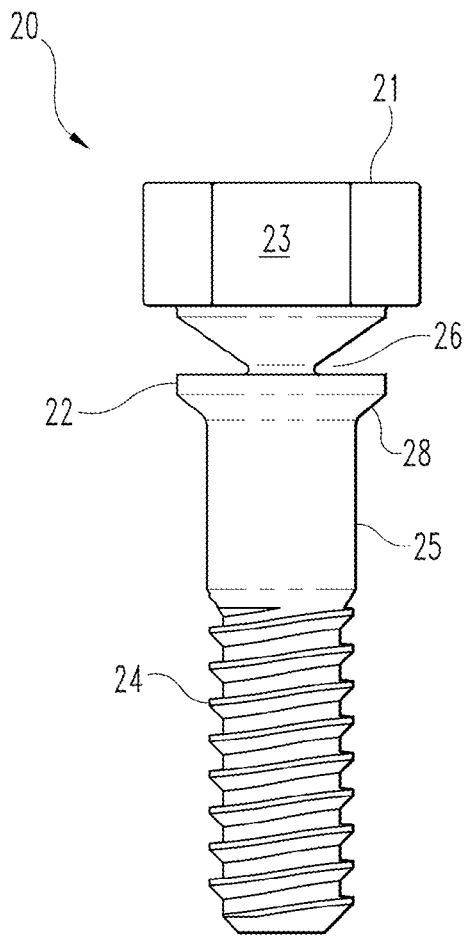
FIG. 2 is a front elevational view of the bolt from the FIG. 1 blind bolt fastener.
Figure 3:
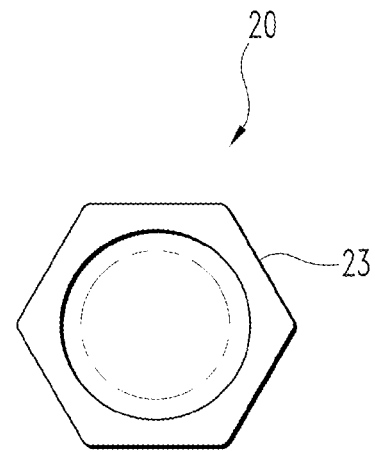
FIG. 3 is a top plan view of the FIG. 2 bolt.

Referring now to FIGS. 2-3, bolt 20 is a threaded bolt that generally includes enlarged head 21, head 22, wrenching portions 23, externally-threaded portion 24, unthreaded portion 25, break groove 26 and frustoconical bearing portion 28 on head 22. Wrenching portion 23 is a conventional hex-shaped configuration. Break groove 26 is configured to fracture and separate enlarged head 21 from the rest of bolt 20 upon application of a predetermined torque to wrenching portion 23.

In the illustrated embodiment, externally-threaded portion 24 includes buttress threads incorporating a steep pressure flank and a shallow non-pressure flank. For example, externally-threaded portion 24 has a pressure flank of between approximately 75° and 90° off the axis of bolt 20 with a non-pressure flank of approximately 45°. The pitch of the thread of each flank is similar to that used for a 60° thread found on existing thread blind bolts such as MIL-S-8879 and MIL-S-7742. Another acceptable thread form is that of a trapezoid thread wherein the pressure and non-pressure flank angles are approximately 75° off the axis of the bolt 20. A trapezoid thread form is easier to form on materials having little ductility, such as certain titanium alloys.

Figure 5:
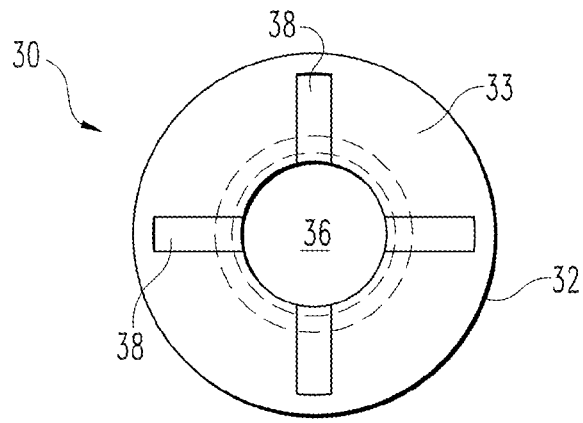
FIG. 5 is a top plan view of the FIG. 4 sleeve.
Figure 4:
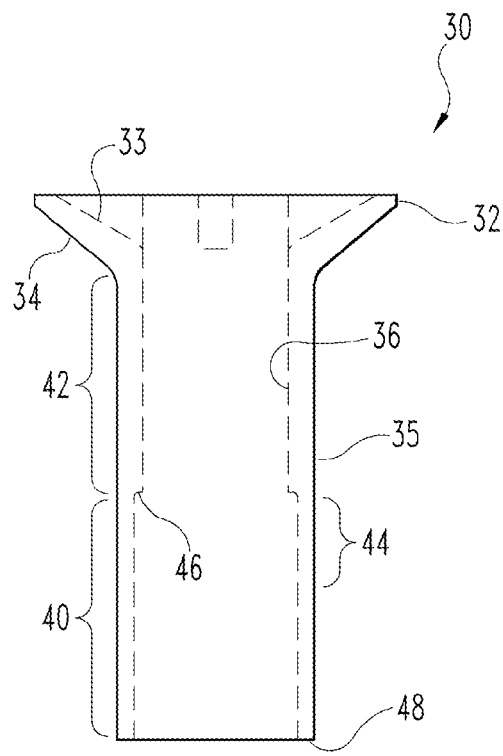
FIG. 4 is a front elevational view of the sleeve from the FIG. 1 blind bolt fastener.
Figure 6:
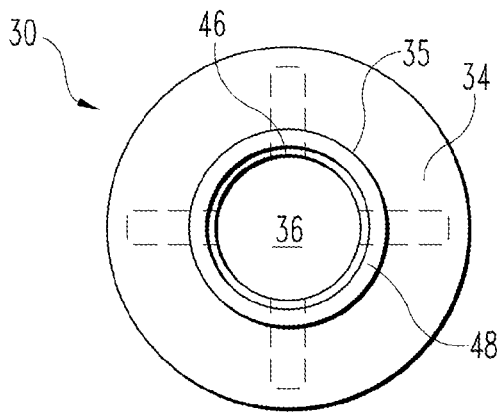
FIG. 6 is a bottom plan view of the FIG. 4 sleeve.

Referring now to FIGS. 4-6, sleeve 30 includes frustoconical head 32, inner bearing portion 33, outer bearing portion 34, a generally cylindrical body having outer surface 35 and defining bore 36, wrenching cavities 38, deformable portion 40, non-deformable portion 42, annealed portion 44, shoulder 46 and end wall 48. In one embodiment, deformable portion 40 is thin walled compared to comparatively thick walled non-deformable portion 42. Wrenching cavities 38 are illustrated in a generally cruciform configuration.

Figure 8:
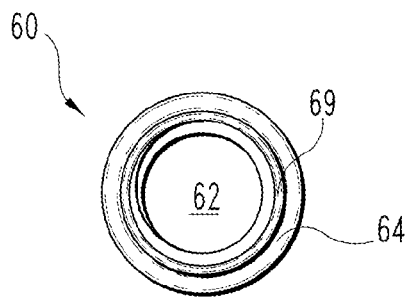
FIG. 8 is a top plan view of the FIG. 7 nut.
Figure 9:
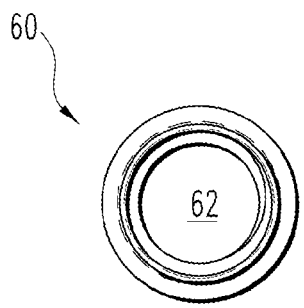
FIG. 9 is a bottom plan view of the FIG. 7 nut.
Figure 7:
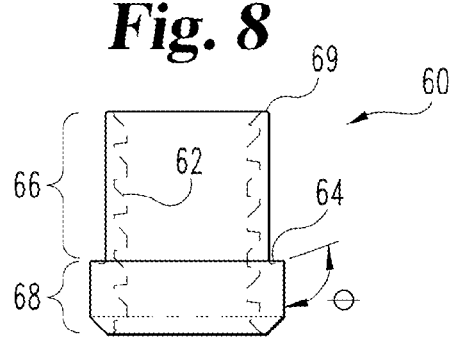
FIG. 7 is a front elevational view of the nut from the FIG. 1 blind bolt fastener.

Referring now to FIGS. 7-9, nut 60 is a generally cylindrical body defining internally-threaded bore 62, ridge 64, thin walled portion 66, thick walled portion 68 and end wall 69. Ridge 64 is sloped at angle θ, which in the illustrated embodiment is approximately 100°.

Figure 10:
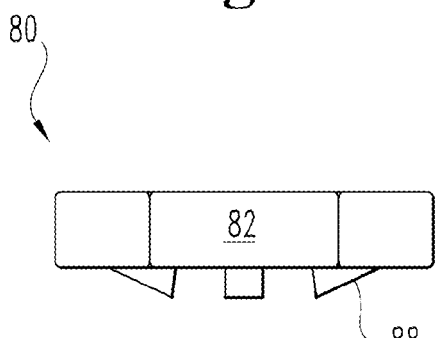
FIG. 10 is a front elevational view of the drive nut from the FIG. 1 blind bolt fastener.
Figure 11:
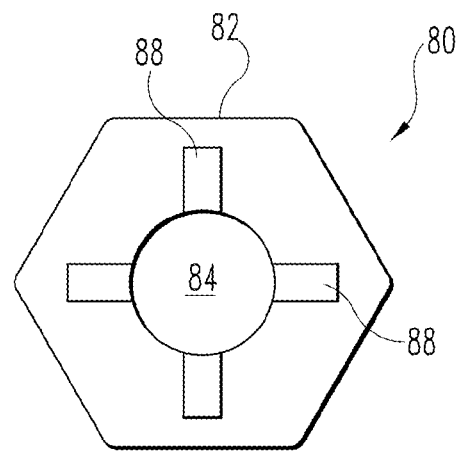
FIG. 11 is a bottom plan view of the FIG. 10 drive nut.

Referring now to FIGS. 10-11, drive nut 80 includes wrenching portion 82, bore 84 and protrusions 88. Protrusions 88 are illustrated in a generally cruciform configuration matching wrenching cavities 38. Each protrusion 88 has an exposed inclined edge. Wrenching portion 82 is a conventional hex-shaped configuration.

Figure 12:
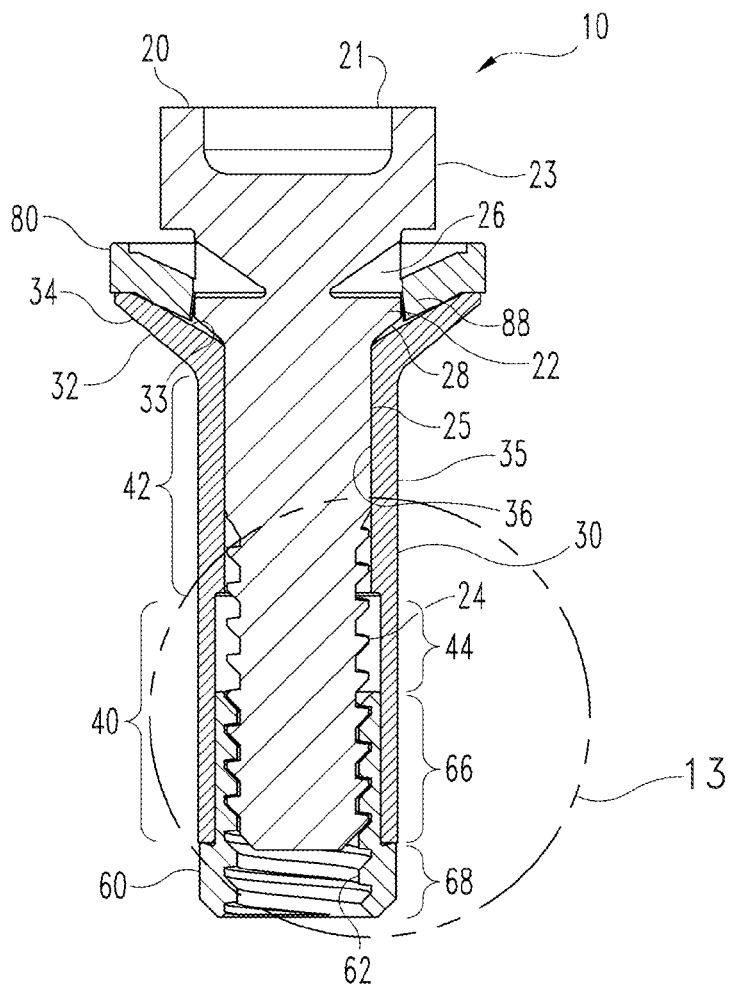
FIG. 12 is a front elevational view, in full section, of the assembled FIG. 1 blind bolt fastener.
Figure 13:
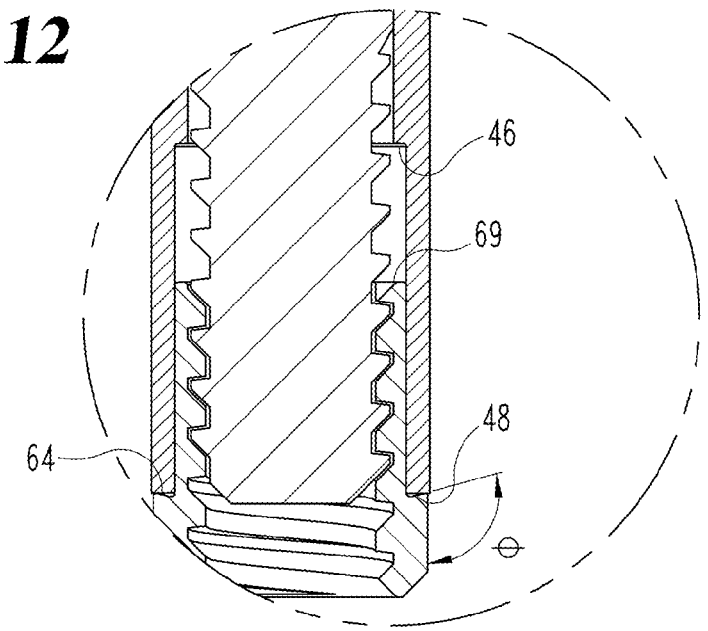
FIG. 13 is an enlarged view of the encircled portion of FIG. 12.

Referring now to FIGS. 12-13, blind bolt fastener 10 is assembled with core bolt 20 extending into bore 36 and bore 84 with externally-threaded portion 24 threadingly engaged with inner threaded bore 62 with end wall 48 abutting ridge 64. Blind bolt fastener 10 is assembled with a slight pretension such that nut 60 and sleeve 30 are substantially rotationally constrained together at the interface between end wall 48 and ridge 64. In alternate embodiments, sleeve 30 and nut 60 may be rotationally constrained together using various methods known in the art including using knurled or other friction enhancers and/or mechanical interlocks therebetween to reduce relative rotation between sleeve 30 and nut 60. In the illustrated embodiment, thin walled deformable portion 40 covers thin wall portion 66. In some embodiments, the contact area between thin walled deformable portions 40 and 66 may also aid nut 60 and sleeve 30 being substantially rotationally constrained together. In this regard, friction enhancers or mechanical interlocks can also be used between thin wall portions 40 and 66.

Protrusions 88 are matched with wrenching cavities 38 so that drive nut 80 and sleeve 30 are rotationally constrained together when assembled. In the embodiment illustrated in FIGS. 1-13, protrusions 88 and wrenching cavities 38 are in a generally cruciform configuration with shallow recesses to fit the countersunk configuration of head 32. However, other embodiments may utilize other configurations for wrenching cavities 38 and protrusions 88, including configurations having a different number, spacing and shape of cavities and protrusions, as appropriate. As assembled, drive nut 80 is constrained between head 32 and enlarged head 21 so that protrusions 88 cannot readily cam out of wrenching cavities 38 so long as enlarged head 21 is attached to bolt 20.

In one embodiment, sleeve 30 is manufactured from a material that exhibits a controllable allotropism. For example, material such as A-286 corrosion and heat resistance steel (CRES). A-286 steel can be heat treated in a conventional manner to harden sleeve 30. Annealed portion 44 may then be selectively annealed to produce a hardness gradient that increases both above and below annealed portion 44. For example, induction heating can be used to selectively heat and anneal annealed portion 44. As is known in the art of induction heat treatment, the size and depth of induction heating can be controlled through choice of induction-frequency, power-density and time. Performing such selective annealing leaves the remaining portions of sleeve 30 having a high hardness and a high shear strength with annealed portion 44 having a lower hardness and exhibiting greater ductility. In the embodiment in which sleeve 30 is hardened, nut 60 may be hardened to a higher hardness than sleeve 30.

In one embodiment, sleeve 30 is fabricated in a conventional manner on a four- or five-die progressive header to produce the shape illustrated in FIGS. 4-6. After fabrication, end wall 48 may be machined to square-up the face of end wall 48 to minimize incidents of nut 60 entering sleeve 30 during installation.

The profile of shoulder 46 and end wall 69 generally match so that when end wall 69 contacts shoulder 46, the load is distributed over sufficient area to stop the bulbing deformation of sleeve 30. Ridge 64 is sloped at angle θ, which in the illustrated embodiment is approximately 100°. In other embodiments, angle θ can be between 90 and 120 degrees. In alternative embodiments, end wall 48 can be beveled to mate with the inclination of ridge 64.

In practice, blind bolt fastener 10 is normally utilized for a range of total thickness of work pieces 90 and 96 (as illustrated in FIGS. 14A-16B) that extends from a minimum to a maximum total work piece thickness. For example, in one embodiment, the range between minimum and maximum thickness may be $\frac{1}{16}^{th}$ of an inch (approximately 1.6 mm). Accordingly, the degree to which portion 44 is annealed and the precise location of annealed portion 44 is determined to provide an appropriately sized bulbed head 45 (as discussed below) over the desired thickness range.

In the illustrated embodiments, installation of blind bolt fastener 10 is terminated upon application of a pre-determined torque by break groove 26 automatically separating enlarged head 21 from the rest of bolt 20. The pre-determined torque is set greater than the torque load required to form bulbed head 45 and abut end wall 69 against shoulder 46. Other embodiments could terminate installation by controlling torque of applied bolt 20 such as through the use of a torque wrench or a torque limited wrench.

Figure 14A:
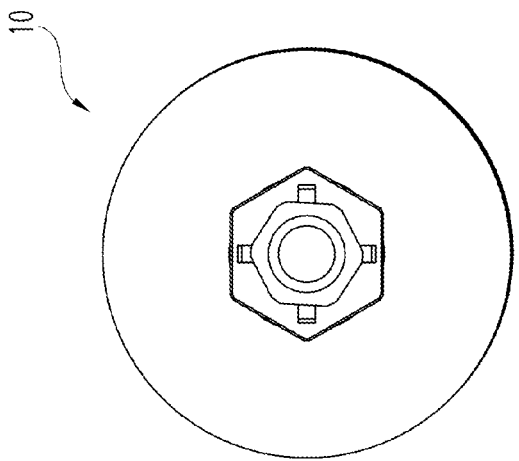
FIG. 14A is a top plan view of the FIG. 1 blind bolt fastener inserted through two work pieces.
Figure 14B:
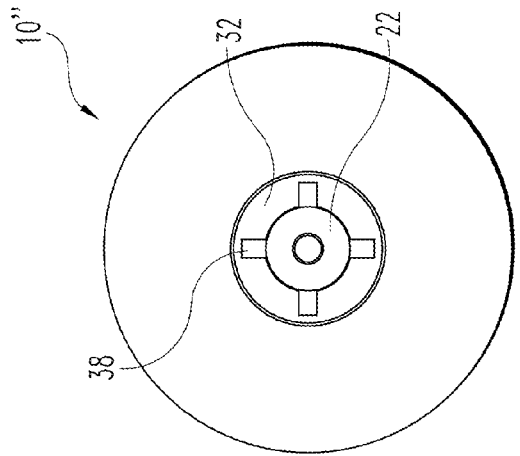
FIG. 14B is a front elevational view, in full section, of the FIG. 14A configuration.

Referring now to FIGS. 14A-B, blind bolt fastener 10 is illustrated inserted through aligned apertures 91 and 97 of work pieces 90 and 96 with outer bearing portion 34 located in and bearing against counter bore 92.

Figure 15A:
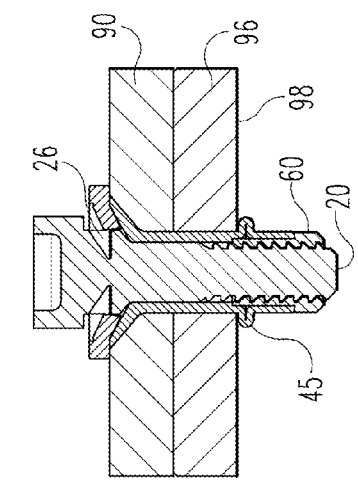
FIG. 15A is a top plan view of the FIG. 1 blind bolt fastener partially installed through two work pieces.
Figure 15B:
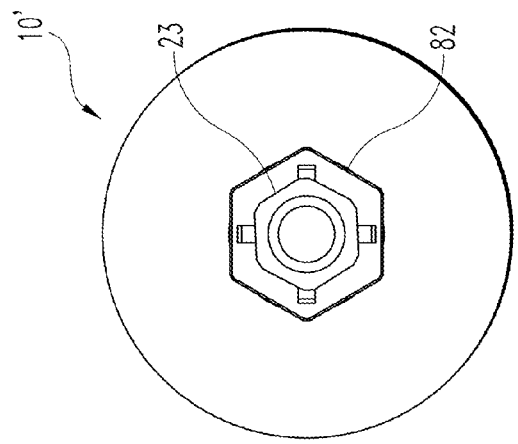
FIG. 15B is a front elevational view, in full section, of the FIG. 15A configuration.

Referring now to FIGS. 15A-B, blind bolt fastener 10' is illustrated, showing blind bolt fastener 10 in a partially installed condition through work pieces 90 and 96. FIGS. 15A-B illustrates nut 60 advanced up bolt 20 such that sleeve 60 has deformed forming bolt head 45 with end wall 69 abutting shoulder 46 as described above with bulbed head 45 bearing against blind side 98.

Figure 16A:
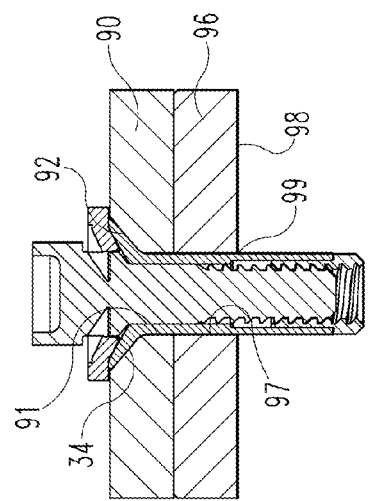
FIG. 16A is a top plan view of the FIG. 1 blind bolt fastener installed fastening two work pieces together.
Figure 16B:
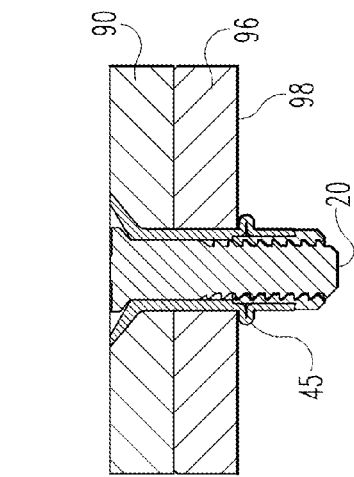
FIG. 16B is a front elevational view, in full section, of the FIG. 16A configuration.

Referring now to FIGS. 16A-B, blind bolt fastener 10" is illustrated, showing blind bolt fastener 10 in an installed configuration with break groove 26 fractured and enlarged head 21 and drive nut 80 removed. The installed configuration of the illustrated embodiment positions unthreaded portion 25 and hardened, non-deformable portion 42 in the shear plane between work pieces 90 and 96 when the fastener is installed (the shear plane being defined in the illustrated embodiments as the interface between work pieces 90 and 96).

Referring now to FIGS. 14A to 16B, blind bolt fastener 10 is installed by inserting blind bolt fastener 10 through aligned apertures such as apertures 91 and 97 in work pieces 90 and 96 as illustrated in FIGS. 14A-B. Sleeve 30 is then restrained by engaging wrenching portion 82 on drive nut 80. Core bolt 20 is then tightened by engaging wrenching portion 23 and tightening bolt 20 to advance nut 60 towards sleeve 30. This results in a columnar load on sleeve 30 causing it to bulb outwardly at its weakest unrestrained point to form bulbed head 45. With a properly configured fastener, this should occur at blind side 98 of work piece 96 to clamp work pieces 90 and 96 together. Aperture 97 constrains sleeve 30 from bulbing outwardly above blind side 98, forcing bulbed head 45 to form outside of blind side 98 and to clamp work pieces 90 and 96 together. Continued tightening of bolt 20 eventually increases the clamping force on work pieces 90 and 96 until end wall 69 abuts shoulder 46, blocking nut 60 from advancing any further up bolt 20. Further tightening of bolt 20 increases torsional load on bolt 20 until the torsional strength of break groove 26 is exceeded, which fractures enlarged head 21 off of the remaining portions of bolt 20 and thereby permits the removal of drive nut 80 and enlarged head 21 from the installed assembly as illustrated in FIGS. 16A-B. The installed assembly maintains the torsional load imparted during installation, thereby maintaining a pre-load clamping force between outer bearing portion 34 and bulbed head 45.

Figure 17:
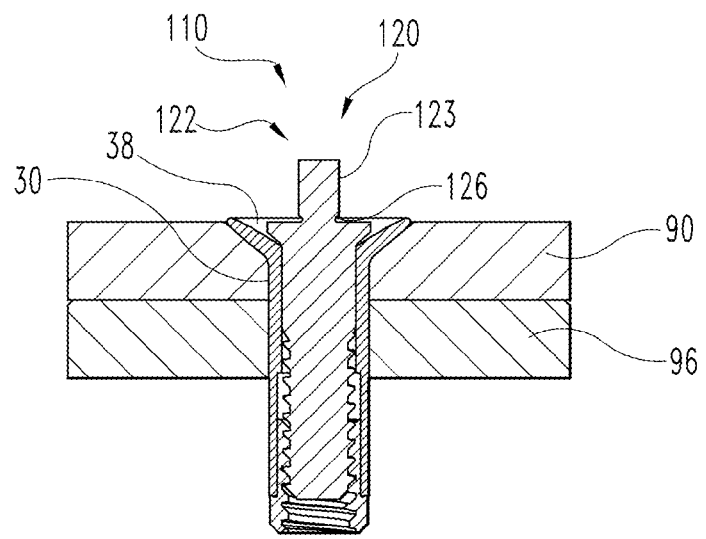
FIG. 17 is a front elevational view, in full section, of an alternate embodiment of a blind bolt fastener inserted through two work pieces.

Referring now to FIG. 17, an alternative embodiment is illustrated as blind bolt fastener 110 with bolt 120 that includes head 122 with wrenching portion 123 and break groove 126. Blind bolt fastener 110 requires the use of an external installation tool with protrusions to engage wrenching cavities 38 on sleeve 30 in lieu of drive nut 80. In other embodiments not utilizing a countersunk head configuration (not illustrated), the sleeve could include external wrenching surfaces, i.e. a conventional hex shaped bolt head, instead of internal wrenching cavities.

Figure 18:
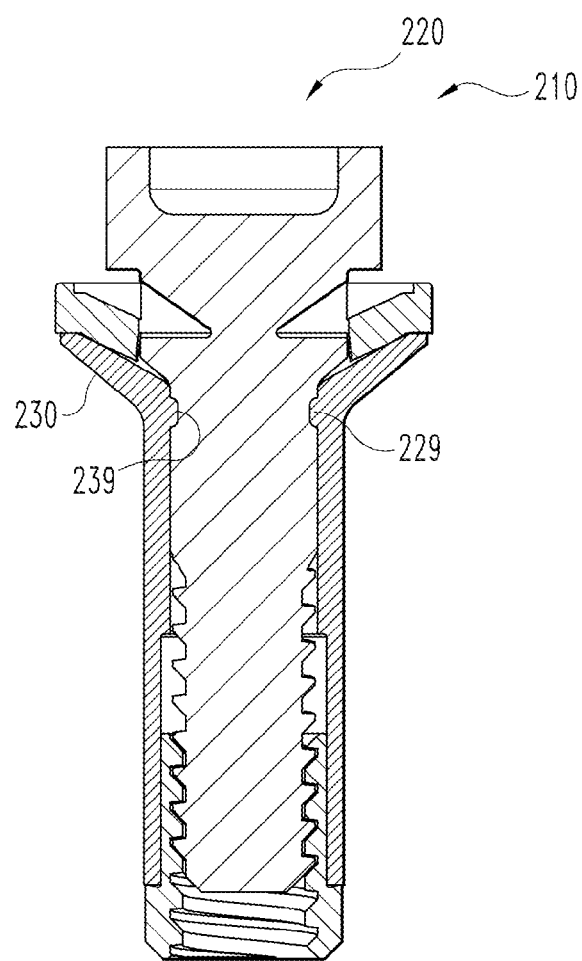
FIG. 18 is a front elevational view, in full section, of an alternate embodiment of a blind bolt fastener.

Referring now to FIG. 18, an alternate embodiment is illustrated as blind bolt fastener 210 comprising bolt 220 and sleeve 230. Bolt 220 includes groove 229 and sleeve 230 includes protuberance 239. Groove 229 and protuberance 239 form a sleeve-to-bolt lock that prevents bolt 220 from disengaging from sleeve 230. The illustrated embodiment may be formed by cold forming sleeve 230 with bolt 220 inserted therein to work material from sleeve 230 into groove 229 thereby creating protuberance 239. While not illustrated, groove 229 and protuberance 239 can be incorporated in any other embodiment.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

I claim:

1. A fastener comprising:
   a deformable sleeve comprising a bore, a shoulder in said bore, a non-deformable portion and a deformable portion;
   a bolt comprising a bolt head and a external-threaded portion;
   a nut comprising a internal-threaded portion threadingly engaged with said external-threaded portion;
   wherein said bolt passes through said bore with said deformable sleeve positioned between said bolt head and said nut;
   wherein said deformable sleeve is constructed and arranged to be compressed upon application of a relative tightening of said bolt through said nut to bulb said deformable portion to form a bulbed head; and
   wherein said shoulder is constructed and arranged to block further compression of said deformable portion when said bulbed head is substantially completely formed when said nut abuts said shoulder.

2. The fastener of claim 1, wherein said bolt further comprises an unthreaded portion positioned between said bolt head and said external-threaded portion.

3. The fastener of claim 2, wherein said unthreaded portion and said non-deformable portion are positioned in the shear plane when said fastener is installed.

4. The fastener of claim 1, wherein said deformable sleeve is hardened.

5. The fastener of claim 4, wherein said deformable sleeve further comprises an annealed portion on said deformable portion.

6. The fastener of claim 1, wherein said nut further comprises a first end wall, a ridge and a thin-walled nut portion that axially separates said ridge and said first end wall, wherein said first end wall abuts said shoulder when said bulbed head is substantially completely formed.

7. The fastener of claim 6, wherein said deformable portion overlaps said thin-walled nut portion.

8. The fastener of claim 6, wherein said ridge is angled between approximately 90 and 120 degrees.

9. The fastener of claim 1, wherein said bolt further comprises a groove and said deformable sleeve further comprises a protuberance that extends into said groove to form a sleeve-to-bolt lock.

10. The fastener of claim 1, further comprising:
    a drive nut engaged with and substantially rotationally constrained with the deformable sleeve;
    wherein said bolt further comprises an enlarged bolt head; and
    wherein said drive nut is substantially axially entrapped between said enlarged bolt head and said sleeve.

11. A fastener comprising:
    a bolt comprising a bolt head and a external-threaded portion;
    a nut comprising a internal-threaded portion threadingly engaged with said external-threaded portion, a ridge and a first end wall;
    a deformable sleeve comprising a thick-walled sleeve portion, a thin-walled sleeve portion, a second end wall and a shoulder, wherein said bolt passes through said deformable sleeve with said deformable sleeve positioned between said bolt head and said first end wall;
    wherein said deformable sleeve and said nut are substantially rotationally constrained together;
    wherein said deformable sleeve is constructed and arranged to bulb upon application of a relative tightening of said bolt through said nut; and
    wherein said shoulder is constructed and arranged to block advancement of said nut on said bolt when said first end wall abuts said shoulder.

12. The fastener of claim 11, wherein said bolt further comprises an unthreaded portion positioned between said bolt head and said external-threaded portion.

13. The fastener of claim 12, wherein said unthreaded portion and said thick-walled portion are positioned in the shear plane when said fastener is installed.

14. The fastener of claim 11, wherein said deformable sleeve is hardened.

15. The fastener of claim 14, wherein said deformable sleeve further comprises an annealed portion on said thin-walled portion.

16. The fastener of claim 11, wherein said nut further comprises a thin-walled nut portion that axially separates said ridge and said first end wall.

17. The fastener of claim 16, wherein said thin-walled sleeve portion overlaps said thin-walled nut portion.

18. The fastener of claim 16, wherein said ridge is angled between approximately 90 and 120 degrees.

19. The fastener of claim 11, wherein said bolt further comprises a groove and said deformable sleeve further comprises a protuberance that extends into said groove to form a sleeve-to-bolt lock.

20. The fastener of claim 11, further comprising:
a drive nut engaged with and substantially rotationally constrained with the deformable sleeve;
wherein said bolt further comprises an enlarged bolt head; and
wherein said drive nut is substantially axially entrapped between said enlarged bolt head and said sleeve.

21. A fastener configured with a minimum grip length and a maximum grip length, the fastener comprising:
a bolt comprising a bolt head and an external-threaded portion;
a nut comprising an internal-threaded portion threadingly engaged with said external-threaded portion, a ridge and a first end wall;
a deformable sleeve comprising a thick-walled sleeve portion, a thin-walled sleeve portion, a second end wall and a shoulder positioned between said thick and thin-walled portions, wherein said bolt passes through said deformable sleeve with said deformable sleeve positioned between said bolt head and said first end wall on said nut;
wherein said deformable sleeve and said nut are substantially rotationally constrained together;
wherein said deformable sleeve is constructed and arranged to bulb to form a bulbed head upon application of a relative tightening of said bolt through said nut; and
wherein said shoulder and said first end wall are constructed and arranged to abut when said bulbed head is substantially completely formed when fastening parts together with a stack up height between the minimum and maximum grip length for the fastener.

22. The fastener of claim 21, wherein said bolt further comprises an unthreaded portion positioned between said bolt head and said external-threaded portion and wherein said thick-walled portion of said deformable sleeve and said unthreaded portion of said bolt are constructed and arranged to be positioned in the shear plane when said shoulder and said first end wall abut.

* * * * *